United States Patent Office.

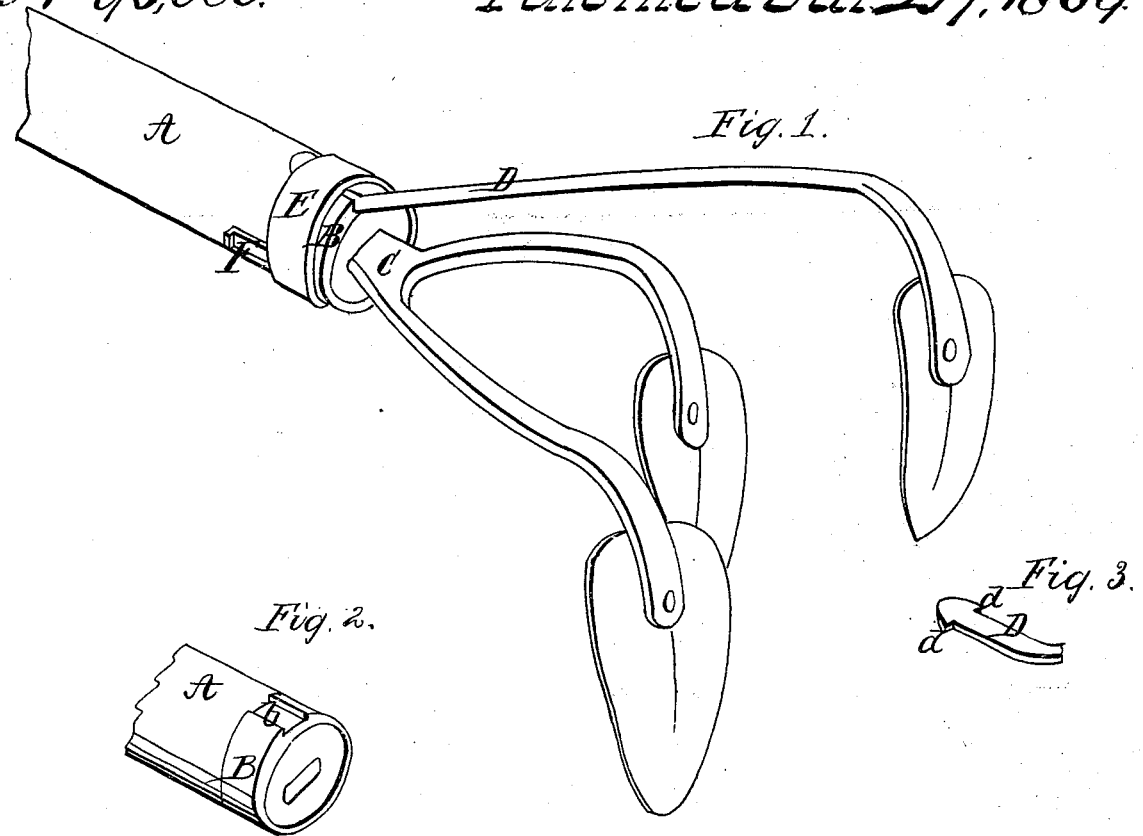

J. H. GILL, OF MOUNT PLEASANT, OHIO.

Letters Patent No. 93,080, dated July 27, 1869.

IMPROVEMENT IN HAND-CULTIVATORS.

The Schedule referred to in these Letters Patent and making part of the same.

*To all whom it may concern:*

Be it known that I, J. H. GILL, of Mount Pleasant, in the county of Jefferson, and State of Ohio, have invented a new and useful Improvement in Hand-Cultivators; and I do hereby declare that the following is a full, clear, and exact description thereof, reference being had to the accompanying drawings, making part of this specification, and to the letters of reference marked thereon.

The nature of my invention consists in constructing a hand-cultivator with two or more hoes or shovels, one or more of which may be permanently attached to the handle, and the others detachable at pleasure by means of a collar and key.

To enable those skilled in the art to which my invention appertains, to make and use the same, I will proceed to describe its construction and operation.

In the drawings—

Figure 1 is a perspective view of my invention.

Figure 2 is a view of the lower end of the handle.

Figure 3 is a view of the inner end of the detachable shank.

A is the wooden handle, similar in form and construction to an ordinary hoe-handle.

On the lower end is a ferrule, B, in which is a notch, $b$.

The shank C of the permanent hoe or hoes is made sharp-pointed, and is attached to the handle by being driven into the end.

The shank D of the detachable hoe or hoes is made to fit the notch $b$ in the ferrule B, and the inner end is formed with shoulders $d\ d$, as shown in fig. 3.

The permanent shank C may be formed with one or more hoes, and the detachable shank D may be formed with any desired number of hoes, or there may be any desired number of detachable shanks, provided with different numbers of hoes.

A collar, E, is made to slide readily on the handle A and ferrule B, and is held in place by a wedge or key, F.

In attaching the additional hoes, the shank D is placed in the notch $b$, with the shoulders $d\ d$ fitting against the inner edge of the ferrule B.

The collar C is then moved down over the ferrule B and shank D, and secured by driving the key F between the collar and ferrule, which holds the shank firmly in the notch, and prevents any lateral displacement, while the shoulders $d\ d$ prevent it from being pulled out.

Having thus described my invention,

What I claim as new, and desire to secure by Letters Patent, is—

A hand-cultivator with detachable hoes, when secured to the handle by means of a collar and key, substantially as shown and described.

J. H. GILL.

Witnesses:
   J. M. FOGLE,
   A. D. HUMPHREVILLE,
   ALONZO J. ALEXANDER.